United States Patent
Kato et al.

(10) Patent No.: US 10,254,842 B2
(45) Date of Patent: Apr. 9, 2019

(54) CONTROLLING A DEVICE BASED ON FACIAL EXPRESSIONS OF A USER

(71) Applicant: SONY CORPORATION, Tokyo (JP)

(72) Inventors: Ayumi Kato, Tokyo (JP); Jun Kimura, Kanagawa (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 212 days.

(21) Appl. No.: 14/518,312

(22) Filed: Oct. 20, 2014

(65) Prior Publication Data

US 2015/0130702 A1 May 14, 2015

(30) Foreign Application Priority Data

Nov. 8, 2013 (JP) ................. 2013-231712

(51) Int. Cl.
*G06F 3/01* (2006.01)
*G06K 9/00* (2006.01)
*G02B 27/01* (2006.01)

(52) U.S. Cl.
CPC ......... *G06F 3/017* (2013.01); *G02B 27/0103* (2013.01); *G02B 27/017* (2013.01); *G02B 2027/014* (2013.01); *G02B 2027/0138* (2013.01); *G02B 2027/0178* (2013.01); *G02B 2027/0187* (2013.01); *G06K 9/00302* (2013.01)

(58) Field of Classification Search
None
See application file for complete search history.

(56) References Cited

U.S. PATENT DOCUMENTS

| | | | | |
|---|---|---|---|---|
| 2005/0083248 A1* | 4/2005 | Biocca | ............... | A41D 31/0088 345/8 |
| 2009/0059021 A1* | 3/2009 | Rimon | ............... | H04N 5/23219 348/222.1 |
| 2010/0073399 A1* | 3/2010 | Apelqvist | ......... | H04M 1/72544 345/619 |
| 2013/0222270 A1* | 8/2013 | Winkler | .............. | H04M 1/0233 345/173 |
| 2013/0291093 A1* | 10/2013 | Matsuoka | ............. | H04L 9/3231 726/19 |
| 2014/0139686 A1* | 5/2014 | Shih | .................... | H04N 5/23219 348/169 |

FOREIGN PATENT DOCUMENTS

JP 2004-178593 A 6/2004

* cited by examiner

*Primary Examiner* — Amr A Awad
*Assistant Examiner* — Andre L Matthews
(74) *Attorney, Agent, or Firm* — Chip Law Group (57) ABSTRACT

There is provided an information processing apparatus including an information acquiring unit provided in the information processing apparatus to be worn on a head of a user, the information acquiring unit being configured to acquire facial expression information of the user, and a control unit configured to perform certain control depending on whether or not the facial expression information of the user acquired by the information acquiring unit agrees with facial expression information of a partner.

14 Claims, 10 Drawing Sheets

CONTROLLING A DEVICE BASED ON FACIAL EXPRESSIONS OF A USER

CROSS REFERENCE TO RELATED APPLICATIONS

This application claims the benefit of Japanese Priority Patent Application JP 2013-231712 filed Nov. 8, 2013, the entire contents of which are incorporated herein by reference.

BACKGROUND

The present disclosure relates to an information processing apparatus, a control method, and a program.

In the related art, there have been proposed techniques to acquire feeling information by analyzing a change in skin conductivity, a heart rate, and an image of a face. The acquired feeling information is classified into, for example, wide range of categories such as "joy", "sadness", "dislike", and "surprise". As a disclosure that uses such feeling information, for example, JP 2004-178593A is given. JP 2004-178593A discloses an image processing method to classify captured photographs by using feeling information that is acquired on the basis of a heart rate or a change in skin conductivity of a user (a photographer).

SUMMARY

However, according to JP 2004-178593A, the user has to wear a device that is dedicated to acquire feeling information that is to be used for classification of captured photographs, which bothers the user and is not convenient very much. Further, as a technique to use facial expression information acquired by analyzing an image of a face as a trigger of photographing, a so-called Smile Shutter, which performs a shuttering operation when a smile of a subject is detected, is known.

However, Smile Shutter only takes the facial expression of the subject into consideration, and does not take the feeling of the photographer into consideration. Accordingly, the present disclosure proposes an information processing apparatus, control method, and program which enable control using, as a trigger, whether the facial expression of the user agrees with the facial expression of a partner.

According to an embodiment of the present disclosure, there is provided an information processing apparatus including an information acquiring unit provided in the information processing apparatus to be worn on a head of a user, the information acquiring unit being configured to acquire facial expression information of the user, and a control unit configured to perform certain control depending on whether or not the facial expression information of the user acquired by the information acquiring unit agrees with facial expression information of a partner.

According to another embodiment of the present disclosure, there is provided a control method including acquiring, by an information acquiring unit provided in an information processing apparatus to be worn on a head of a user, facial expression information of the user, and performing certain control depending on whether or not the acquired facial expression information of the user agrees with facial expression information of a partner.

According to another embodiment of the present disclosure, there is provided a program for causing a computer to function as an information acquiring unit provided in the information processing apparatus to be worn on a head of a user, the information acquiring unit being configured to acquire facial expression information of the user, and a control unit configured to perform certain control depending on whether or not the facial expression information of the user acquired by the information acquiring unit agrees with facial expression information of a partner.

As described above, according to one or more of embodiments of the present disclosure, it becomes possible to perform control using, as a trigger, whether the facial expression of the user agrees with the facial expression of the partner. Note that the effects described above are not limiting. That is, the technology according to the present disclosure can exhibit any of the effects described in the specification or other effects that are apparent from the descriptions in the specification, along with the above effects or instead of the above effects.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be made in the following order:

1. Overview of an information processing apparatus according to an embodiment of the present disclosure
2 Basic configuration
3. Operation processing
3-1. Basic processing
3-2. Specific record control processing
4. Conclusion

Figure 1:
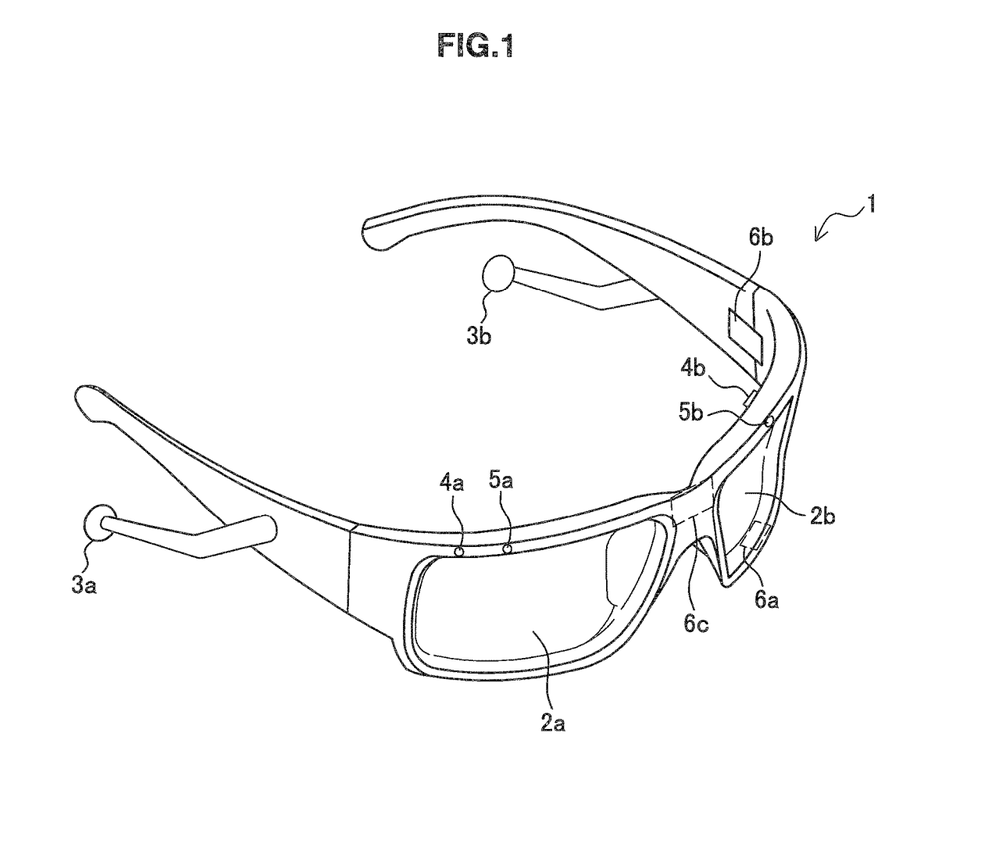
FIG. 1 shows an overview of an information processing apparatus according to an embodiment of the present disclosure.

1. Overview of an Information Processing Apparatus According to an Embodiment of the Present Disclosure First of all, an overview of an information processing apparatus 1 according to an embodiment of the present disclosure will be described with reference to FIG. 1. As shown in FIG. 1, the information processing apparatus 1 according to the present embodiment is a glasses-type head mounted display (HMD) and is worn by a user with temples being fixed on both external ears, the temples extending toward both sides of a head, for example.

Further, the information processing apparatus 1 (glasses-type HMD) has a structure in which a pair of display units 2a and 2b for left and right eyes are arranged immediately before both eyes of the user, that is, at portions where lenses are located in a case of usual glasses, in the state where the information processing apparatus 1 is worn. Hereinafter, the display units 2a and 2b will be collectively referred to as display unit 2 if not particularly distinguished.

On the display unit 2, for example, a captured image of a real space, which is captured with an outside camera 4a, is displayed, or an image is displayed so as to be superimposed on an object in the real space. Further, the display unit 2 may be a transmission type, in which case, when the information processing apparatus 1 sets the display unit 2 to be in a through state, that is, a transparent or a semitransparent state, the user's usual life is not hindered even when the user wears the information processing apparatus 1 continuously like glasses. As shown in FIG. 1, the outside camera 4a is disposed forward (toward outside) so as to image the direction in which the user views as the direction of a subject in the state where the user wears the information processing apparatus 1.

The information processing apparatus 1 also includes an inside camera 4b disposed toward inside so as to image the user's eyes and the periphery thereof in the state where the user wears the information processing apparatus 1. The information processing apparatus 1 further includes a sensor that detects the movement of the skin of the user's face in the state where the user wears the information processing apparatus 1. The sensor is achieved by a photo reflector (pyroelectric sensor), for example. As shown in FIG. 1, a plurality of photo reflectors 6a to 6c, each of which is a sensor that detects the movement of the skin, are disposed on a lower portion of the display unit 2b, on the inner surface of the temple of the information processing apparatus 1, and between the display unit 2a and the display unit 2b, respectively, for example.

Further, the information processing apparatus 1 includes a pair of earphone speakers 3a and 3b, which can be inserted into the right ear hole and the left ear hole of the user in the state where the user wears the information processing apparatus 1. Furthermore, a microphone 5a and a microphone 5b, which collect external sounds, are disposed on the right of the display unit 2 for the right eye and on the left of the display unit 2 for the left eye. Note that the appearance of the information processing apparatus 1 shown in FIG. 1 is just an example, and a variety of structures that enable the user to wear the information processing apparatus 1 can be considered. The information processing apparatus 1 is generally configured by a glasses-type wearable unit or a head mounted type wearable unit, and at least detects the movement of the user's head.

The pair of display units 2 corresponding to both eyes may be provided, or one display unit 2 corresponding to either of the eyes may be provided. Although the outside camera 4a is disposed forward on the right eye side in the example shown in FIG. 1, the outside camera 4a may be disposed on the left eye side or on both sides. Further, although the inside camera 4b is disposed toward inside on the left eye side in the example shown in FIG. 1, the inside camera 4b may be disposed on the right eye side or on both sides. The earphone speakers 3a and 3b are not necessarily two stereo speakers for the left and right, but may be one speaker to be worn on either of the ears. Further, as for the microphone, only one of the microphones 5a and 5b may be used. Furthermore, such a structure may be possible that does not include the inside camera 4b, the microphones 5a and 5b, and the earphone speakers 3a and 3b.

(Background)

Here, in the related art, a shutter operation is performed when a smile of a subject is detected or the feeling of the user at the time of photographing is acquired by analyzing a change in skin conductivity or a heart rate so as to be associated with a scene; however, the related art does not refer to control based on the facial expression of the user and the subject.

Accordingly, according to the present embodiment, the information processing apparatus 1 is made more convenient by performing certain control (operation) that uses, as a trigger, whether the facial expression of the user who wears the information processing apparatus 1 capable of acquiring facial expression information agrees with the facial expression of the partner. Specifically, for example, the information processing apparatus 1 proposed in the present embodiment can record the moment when the user and the partner has the same feeling by performing a shutter operation when the facial expressions of the user and the partner agree with each other, that is, the user and the partner feel sympathy.

The overview of the information processing apparatus 1 according to an embodiment of the present disclosure has been described above. Next, a basic configuration of the information processing apparatus 1 according to an embodiment of the present disclosure will be described.

2. Basic Configuration

Figure 2:
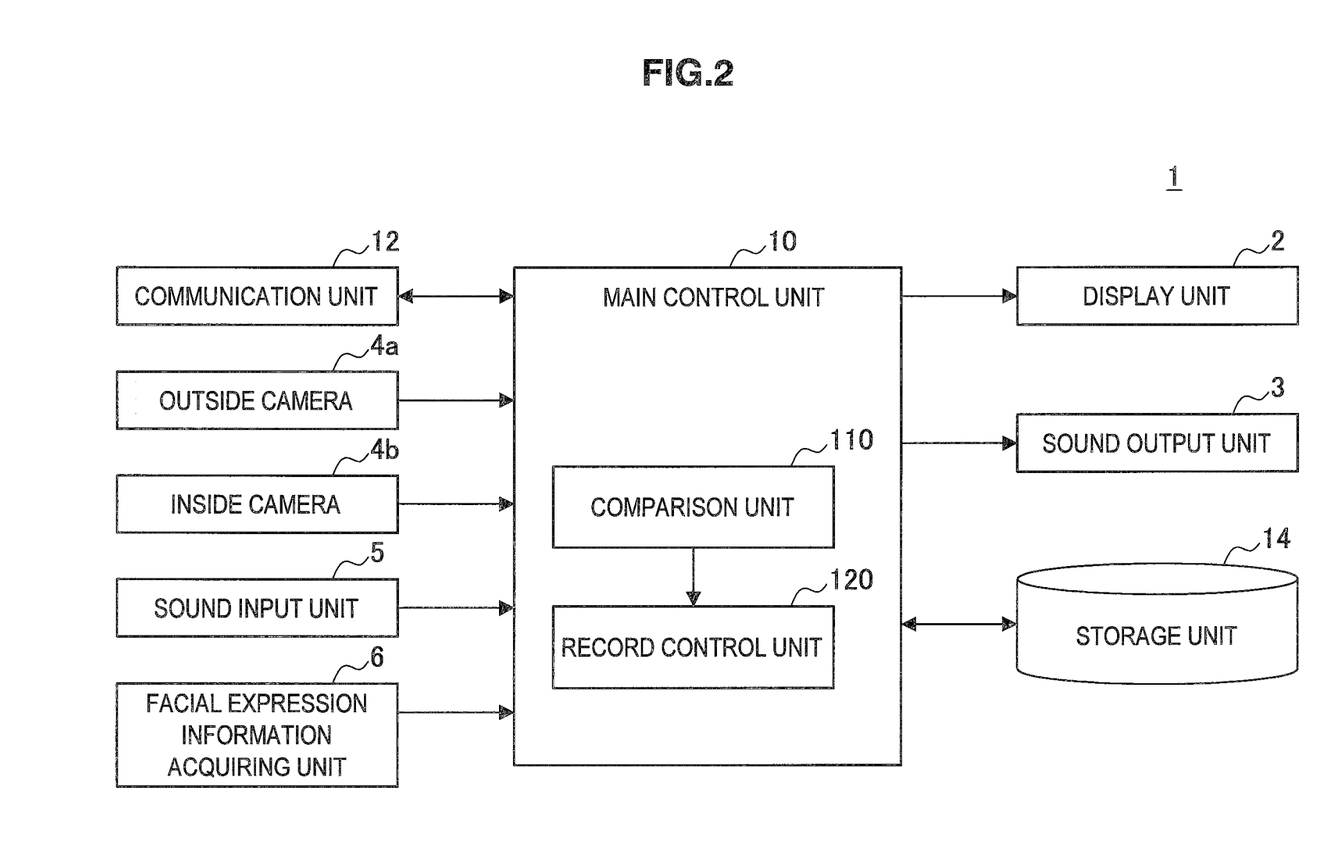
FIG. 2 is a block diagram showing a basic configuration of an information processing apparatus according to the present embodiment.

FIG. 2 is a block diagram showing a basic configuration of the information processing apparatus 1 according to the present embodiment. As shown in FIG. 2, the information processing apparatus 1 includes a main control unit 10, the display unit 2, a sound output unit 3, the outside camera 4a, the inside camera 4b, a sound input unit 5, a facial expression information acquiring unit 6, a communication unit 12, and a storage unit 14.

(Facial Expression Information Acquiring Unit)

The facial expression information acquiring unit 6 has a function of acquiring facial expression information of the user in the state where the user wears the information processing apparatus 1. Specifically, the facial expression information acquiring unit 6 acquires facial expression information of the user on the basis of detection results of the movement of the skin of the face, for example. A sensor that detects the movement of the skin of the face is achieved by, not only the above described photo reflectors (pyroelectric sensors) 6a to 6c, but also various proximity sensors, distance sensors, and the like.

The photo reflector 6a according to the present embodiment is provided on a lower portion of the display unit 2b as shown in FIG. 1, and can detect the movement of the cheek in the state where the user wears the information processing apparatus 1.

Further, the photo reflector 6b is provided on the inner surface of the temple of the information processing apparatus 1, and can detect the movement of a side portion of the corner of the eye in the state where the user wears the information processing apparatus 1.

Further, the photo reflector 6c is provided between the display unit 2a and the display unit 2b of the information processing apparatus 1, and can detect the movement of a portion between the eyebrows in the state where the user wears the information processing apparatus 1.

In this manner, when the user wears the information processing apparatus 1, which is a glasses-type head wearable device capable of being worn on a daily basis, each of the photo reflectors 6a to 6c can detect the movement of the skin of the user's face. Then, the facial expression information acquiring unit 6 acquires facial expression information on the basis of the detection results obtained by the photo reflectors 6a to 6c. Here, acquiring facial expression information on the basis of data detected by the photo reflectors 6a to 6c will be specifically described with reference to FIG. 3 to FIG. 6.

Figure 3:
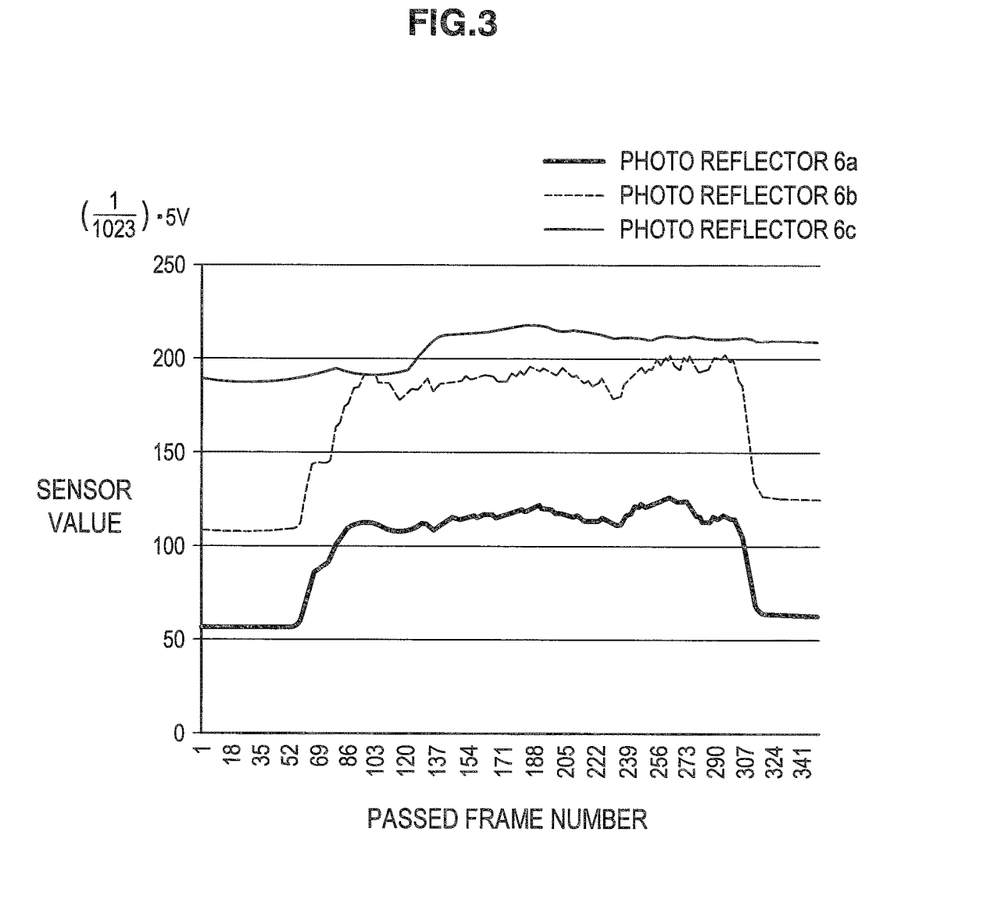
FIG. 3 shows an example of data detected by a plurality of photo reflectors in a case of a smile.

FIG. 3 shows detection data obtained by the photo reflectors 6a to 6c in a case of a smile. As shown in FIG. 3, in a case of a smile, the movement of the cheek (detected by the photo reflector 6a) and the movement of the side portion of the corner of the eye (detected by the photo reflector 6b) are detected, and the movement of the portion between the eyebrows (detected by the photo reflector 6c) is hardly detected.

Figure 4:
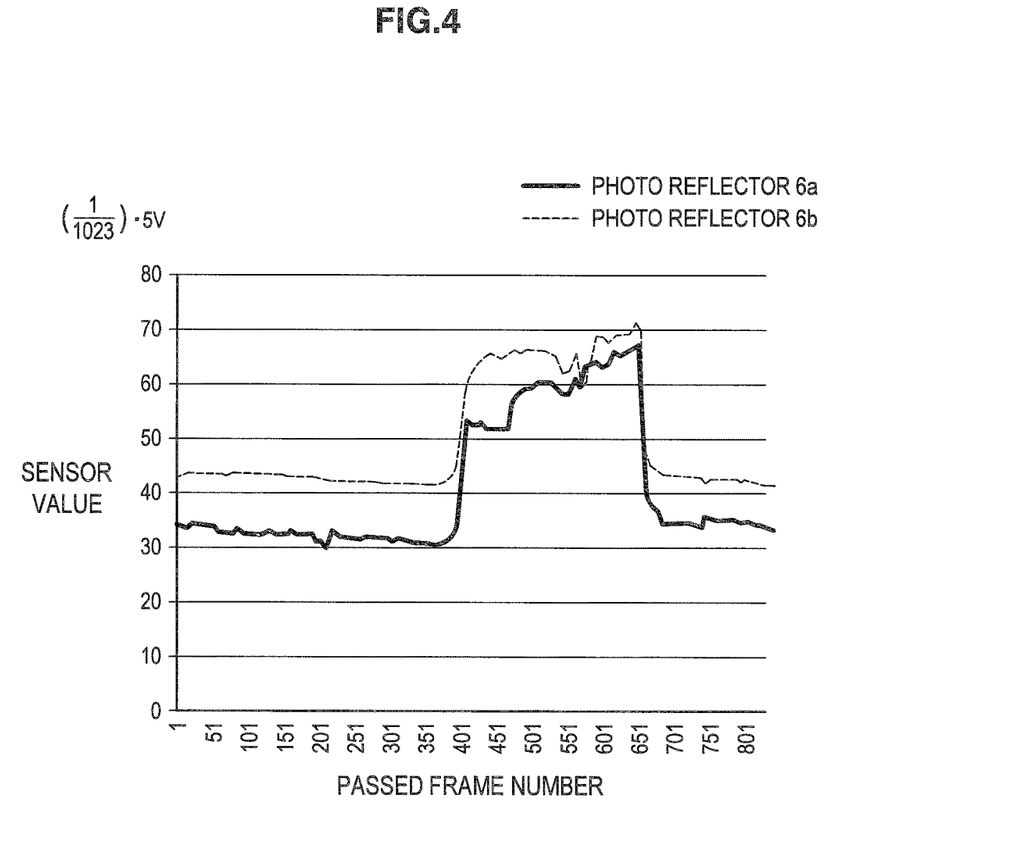
FIG. 4 shows an example of data detected by a plurality of photo reflectors when a test subject A smiles.
Figure 5:
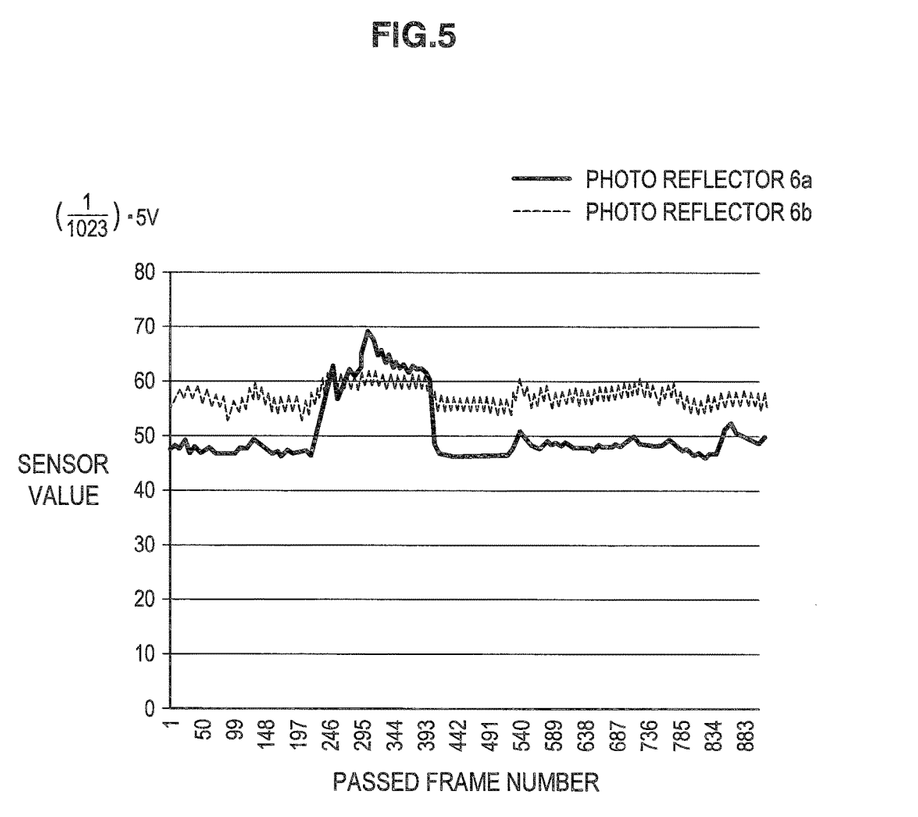
FIG. 5 shows an example of data detected by a plurality of photo reflectors when a test subject B smiles.

Accordingly, in a case in which the movement of the cheek and the movement of the side portion of the corner of the eye are both detected as shown in FIG. 3, the facial expression information acquiring unit 6 can determine "smile" and acquire facial expression information of "smile". Note that, as a reference example, FIG. 4 and FIG. 5 show detection data obtained by the photo reflectors 6a and 6b at the time when different test subjects smile. FIG. 4 and FIG. 5 show only detection data obtained by the photo reflectors 6a and 6b which detect portions where the movement of the skin occurs at the time of a smile.

FIG. 4 shows detection data obtained by the photo reflectors 6a and 6b when a test subject A smiles. FIG. 5 shows detection data obtained by the photo reflectors 6a and 6b when a test subject B smiles. In both cases, both the movement of the cheek (detected by the photo reflector 6a) and the movement of the side portion of the corner of the eye (detected by the photo reflector 6b) are detected. In general, when a person smiles, the person tends to move the cheek and the side portion of the corner of the eye at substantially the same time. Accordingly, the facial expression information acquiring unit 6 can determine "smile" and acquire facial expression information of "smile" when both the movement of the cheek and the movement of the side portion of the corner of the eye are detected.

Figure 6:
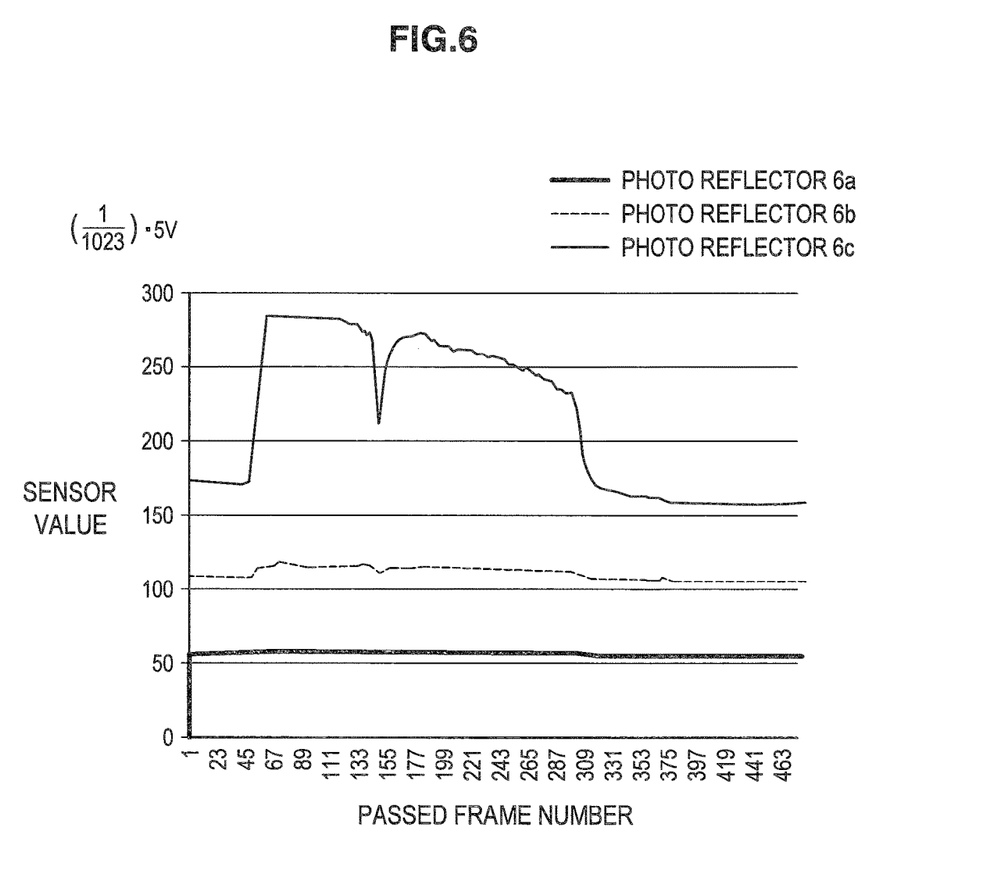
FIG. 6 shows an example of data detected by a plurality of photo reflectors in a case of dislike.

Next, a case of acquiring facial expression information of "dislike" will be described with reference to FIG. 6. FIG. 6 shows detection data obtained by the photo reflectors 6a to 6c in a case of dislike. As shown in FIG. 6, in a case of dislike, a large movement of a portion between the eyebrows (detected by the photo reflector 6c) is detected, and the movement of the cheek (detected by the photo reflector 6a) and the movement of the side portion of the corner of the eye (detected by the photo reflector 6b) are hardly detected. Accordingly, in a case in which the movement of the cheek and the movement of the side portion of the corner of the eye are not detected and only the movement of the portion between the eyebrows is detected, the facial expression information acquiring unit 6 can determine "dislike" and acquire facial expression information of "dislike".

The cases in which the facial expression information acquiring unit 6 acquires facial expression information on the basis of the movement of the skin detected by the photo reflectors 6a to 6c have been specifically described above. Note that the facial expression information acquiring unit 6 can acquire facial expression information on the basis of an image of the user's eye captured by the inside camera 4b. Specifically, for example, the facial expression information acquiring unit 6 can acquire facial expression information from the movement of the line of sight or pupil of the user, a change in the movement of the skin on the periphery of the eye, and the like.

(Main Control Unit)

The main control unit 10 is configured by a central processing unit (CPU), read only memory (ROM), random access memory (RAM), nonvolatile memory, or a microcomputer including an interface portion, for example, and controls each structural element of the information processing apparatus 1.

Further, the main control unit 10 according to the present embodiment functions as a comparison unit 110 and a record control unit 120 as shown in FIG. 2. The comparison unit 110 compares facial expression information of the user who wears the information processing apparatus 1 with facial expression information of the partner to determine whether or not the facial expression information of the user agrees with the facial expression information of the partner. The facial expression information of the user is outputted from the facial expression information acquiring unit 6. Meanwhile, acquiring the facial expression information of the partner can take the following two patterns.

Figure 7:
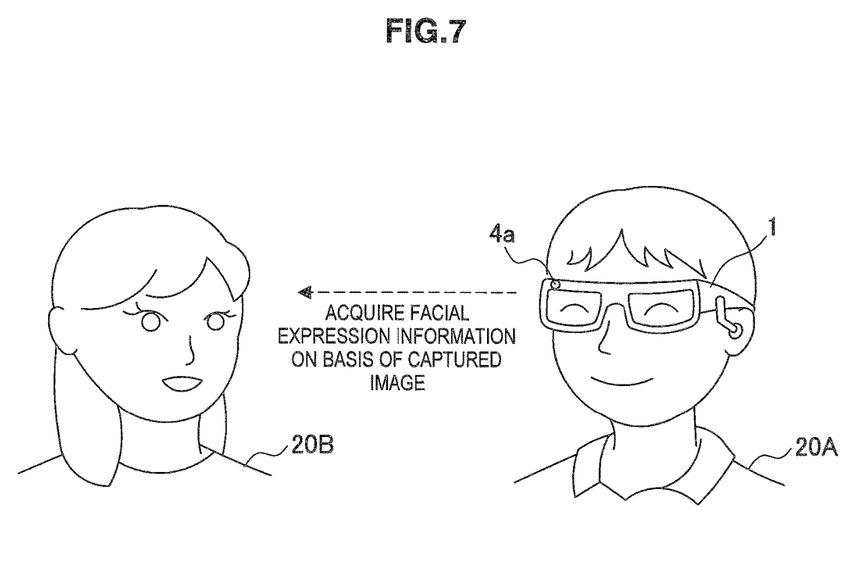
FIG. 7 shows a first pattern of acquiring facial expression information of a partner with an information processing apparatus of the present embodiment.

FIG. 7 shows a first pattern of acquiring the facial expression information of the partner. As shown in FIG. 7, in a case in which only a user 20A wears the information processing apparatus 1 and the user 20A communicates with the partner, a user 20B, the information processing apparatus 1 images the user 20B with the outside camera 4a disposed forward (toward outside), and acquires the facial expression information of the partner (the user 20B) on the basis of the captured image.

Figure 8:
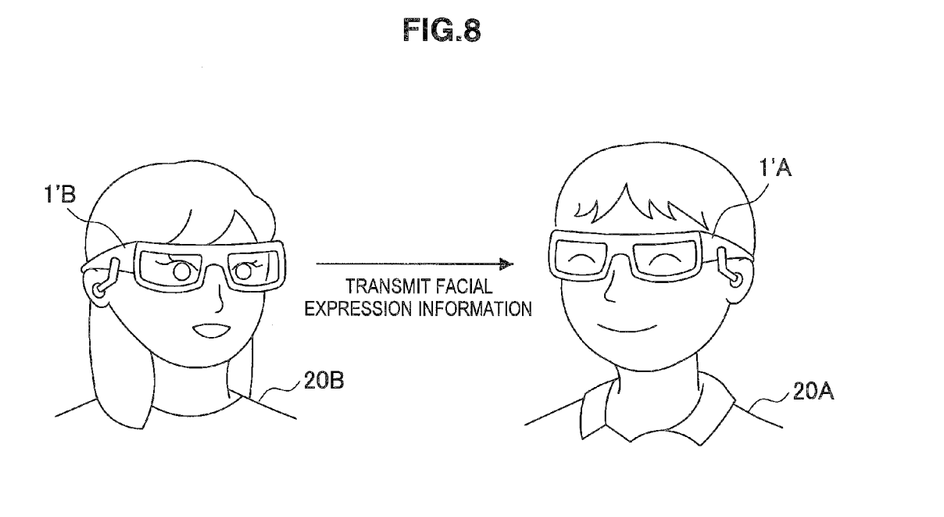
FIG. 8 shows a second pattern of acquiring facial expression information of a partner with an information processing apparatus of the present embodiment.

On the other hand, FIG. 8 shows a second pattern of acquiring the facial expression information of the partner. As shown in FIG. 8, in a case in which the user 20A and the user 20B wear an information processing apparatus 1'A and an information processing apparatus 1'B, respectively, and the users 20A and 20B communicate with each other, the information processing apparatus 1'A can receive and acquire the facial expression information of the partner (the user 20B) from the information processing apparatus 1'B. This is because the information processing apparatus 1'B can acquire the facial expression information of the user 20B who wears the information processing apparatus 1'B, with the facial expression information acquiring unit 6 provided in the information processing apparatus 1'B.

The comparison unit 110 outputs the comparison results of the facial expression information of the user and the facial expression information of the partner to the record control unit 120.

The record control unit 120 performs certain record control depending on the comparison results obtained by the comparison unit 110. The certain control is, for example, control in which at least one of a captured image, sound data, place, and time is recorded. More specifically, for example, in a case in which the facial expression of the user agrees with the facial expression of the partner, the outside camera 4a performs imaging (a shutter operation), and causes the storage unit 14 to store captured image. Accordingly, in the related art, the shutter automatically operates only when the subject is smiling; however, according to the present embodiment, the shutter can operate at the moment when the subject and the user feel sympathy and have the same feeling. Further, the record control unit 120 may add a tag of "sympathy" (or a tag of agreed facial expression information) to the captured image to be stored.

Furthermore, the record control unit 120 may add a tag of "sympathy" (or a tag of agreed facial expression information) to a corresponding lifelog when the comparison unit 110 determines that the comparison unit 110 determines that the facial expression of the user agrees with the facial expression of the partner in a case in which the outside camera 4a or the sound input unit 5 continuously records the ambient scenery or sound as a lifelog. Accordingly, it becomes possible to extract and reproduce a sympathy scene when a lifelog is reproduced.

(Communication Unit)

The communication unit 12 is connected to an external device with or without wires, and has a function of transmitting and receiving data. The communication unit 12 according to the present embodiment is connected to a smartphone, a tablet terminal, or the like owned by the user, and transmits the captured image to which the sympathy tag is added and which is stored in the storage unit 14, for example. Further, the communication unit 12 can be connected to another information processing apparatus worn on the head of the partner who communicates with the user to receive the facial expression information of the partner.

(Outside Camera, Inside Camera)

Each of the outside camera 4a and the inside camera 4b includes a lens system including an imaging lens, an iris, a zoom lens, a focus lens, and the like; a driving system that causes the lens system to perform a focus operation or a zoom operation; a solid-state image sensor array that generates imaging signals by photoelectric conversion of imaging light obtained by the lens system; and the like. The solid-state image sensor array may be achieved by a charge coupled device (CCD) sensor array or a complementary metal oxide semiconductor (CMOS) sensor array, for example.

The outside camera 4a is disposed forward (toward outside) so as to image the direction in which the user views as the direction of a subject in the state where the user wears the information processing apparatus 1. Accordingly, the outside camera 4a can image the face of the partner who talks with the user. Further, the inside camera 4b is disposed toward inside in the state where the user wears the information processing apparatus 1. Accordingly, the inside camera 4b can image the user's eyes and the periphery thereof.

(Sound Input Unit)

The sound input unit 5 includes the microphones 5a and 5b shown in FIG. 1 and a microphone amplifier unit that amplifies sound signals obtained by the microphones 5a and 5b and an A/D converter, and outputs sound data to the main control unit 10. The main control unit 10 performs processing such as noise reduction or sound source separation on the sound data obtained in the sound input unit 5, and then performs sound recognition, so that the user can input sounds. Further, in the main control unit 10, sound recording becomes possible by subjecting the sound data obtained in the sound input unit 5 to processing such as noise reduction or sound source separation and then storing the sound data in the storage unit 14.

(Display Unit)

The display unit 2 displays image data under control of the main control unit 10. The display unit 2 may be a transmission type display device as described above.¥

(Sound Output Unit)

The sound output unit 3 includes the pair of earphone speakers 3a and 3b shown in FIG. 1 and an amplifier circuit for the earphone speakers 3a and 3b. Further, the sound output unit 3 may be configured as a so-called bone conduction speaker. The sound output unit 3 outputs (reproduces) sound signal data under control of the main control unit 10.

(Storage Unit)

The storage unit 14 stores a program for causing the main control unit 10 to perform various kinds of processing, for example. The storage unit 14 may also store action feature amount calculated on the basis of learnt data of the movement of the head. The configuration of the information processing apparatus 1 according to the present embodiment has been described above in detail. Next, operation processing of the information processing apparatus 1 according to the present embodiment will be described with reference to flowcharts shown in FIG. 9 and FIG. 10.

3. Operation Processing

<3-1. Basic Processing>

Figure 9:
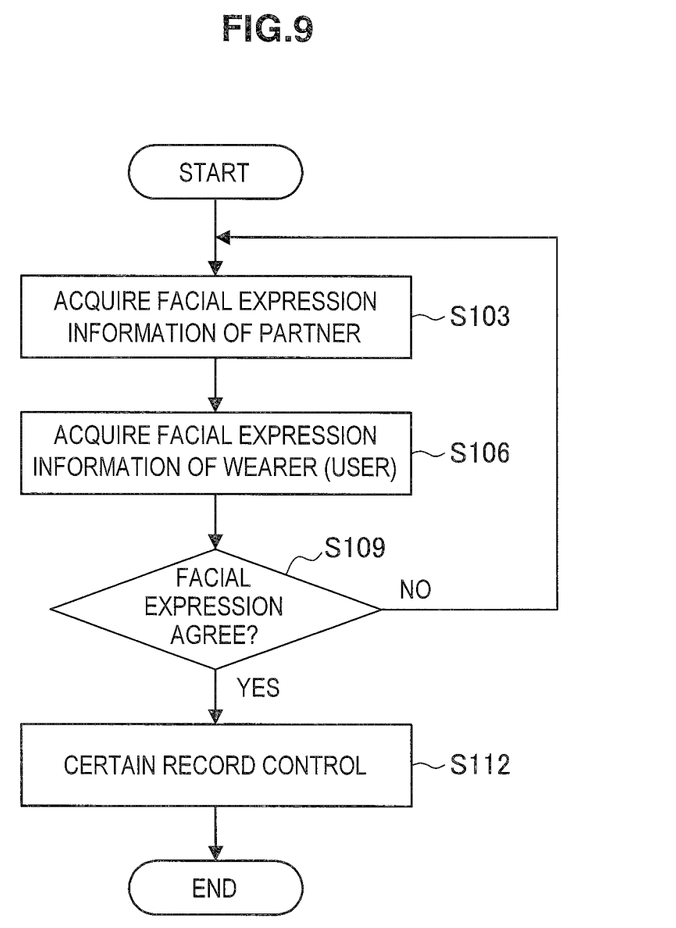
FIG. 9 is a flowchart showing basic processing of an information processing apparatus according to the present embodiment.

FIG. 9 is a flowchart showing basic processing of the information processing apparatus 1 according to the present embodiment. As shown in FIG. 9, first, in step S103, the comparison unit 110 acquires the facial expression information of the partner. The facial expression information of the partner can be received through the communication unit 12 from another information processing apparatus worn on the head of the partner or can be acquired on the basis of an image of the partner's face captured with the outside camera 4a.

Next, in step S106, the comparison unit 110 acquires the facial expression information of the user (wearer). The facial expression information of the user is acquired by the facial expression information acquiring unit 6 on the basis of the movement of the skin of the user's face, for example, and is outputted to the comparison unit 110.

Next, in step S109, the comparison unit 110 determines whether or not the facial expression information of the user agrees with the facial expression information of the partner. Then, in a case in which it is determined that the facial expression information of the user agrees with the facial expression information of the partner (S109/Yes), in step S112, the record control unit 120 performs certain record control. Accordingly, the information processing apparatus 1 can record the moment when the user and the partner feel sympathy. Further, since the information processing apparatus 1 is achieved by a general glasses-type HMD worn on the head, various kinds of control can be performed without limitation to the record control using detection of the sympathy according to the present embodiment as a trigger.

Next, specific record control processing by the information processing apparatus 1 according to the present embodiment will be described.

<3-2. Specific Record Control Processing>

Figure 10:
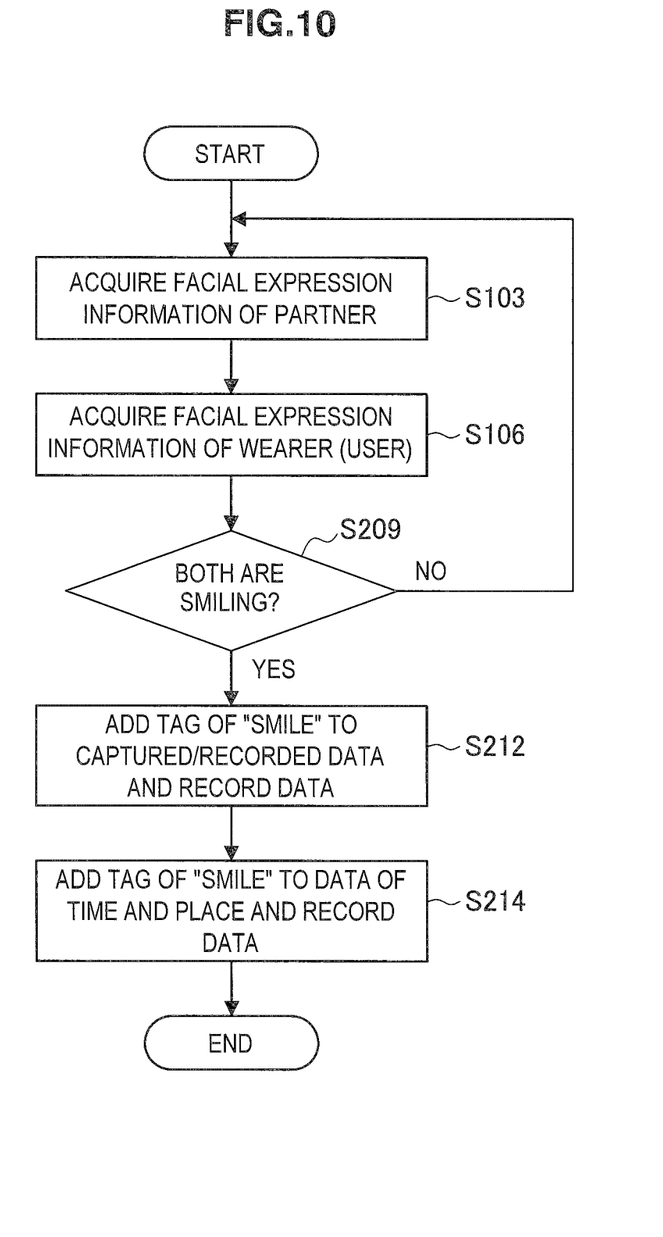
FIG. 10 is a flowchart showing specific record control processing by an information processing apparatus according to the present embodiment.

FIG. 10 is a flowchart showing specific record control processing by the information processing apparatus 1 according to the present embodiment. As shown in FIG. 10, first, in the step S103 and the step S106, the comparison unit 110 acquires the facial expression information of the partner and the facial expression information of the user in the same manner as those steps shown in FIG. 9.

Next, in step S209, the comparison unit 110 determines whether or not both the user and the partner are smiling on the basis of the facial expression information of the user and the facial expression information of the partner.

Next, in a case in which it is determined that both the user and the partner are smiling (S209/Yes), in step S212, the record control unit 120 performs an imaging operation or a sound recording operation, and adds a tag of "smile" to the acquired captured image data or the acquired sound data to store the data in the storage unit 14.

Next, in step S214, the record control unit 120 also adds a tag of "smile" to data of the current time and the current location (place) and stores the data in the storage unit 14. The current location can be measured by a location measuring unit (not shown) included in the information processing apparatus 1. The location measuring unit is achieved by a measuring unit that performs location measuring using a global positioning system (GPS) or Wi-Fi radio waves, for example.

Accordingly, the information processing apparatus 1 can record the captured image of the moment when both the user and the partner feel sympathy and show "smile", the sound data at the moment, or the time when and the place where both the user and the partner feel sympathy.

4. Conclusion

As described above, the information processing apparatus 1 according to an embodiment of the present disclosure acquires the facial expression information of the user and the facial expression information of the partner, and performs certain record control depending on whether the facial expression of the user agrees with the facial expression of the partner, so as to make the information processing apparatus 1 more convenient. Specifically, for example, the information processing apparatus 1 performs a shutter operation when the facial expression of the user agrees with the facial expression of the partner, so as to image the moment when the user and the partner have the same feeling and feel sympathy.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof. For example, it is possible to create a computer program for causing hardware such as the CPU, ROM, RAM, or the like, incorporated in the above described information processing apparatus 1, to exhibit functions of the information processing apparatus 1. Further, there is provided a computer-readable storage medium having the computer program stored therein. Furthermore, it is possible to extract only the sympathy scene at the time of reproduction because the tag of sympathy has been added to the captured image that has been imaged using the sympathy of the user and the partner as a trigger.

In a case in which the facial expression of the user agrees with the facial expression of the partner, the facial expression information acquiring unit 6 of the information processing apparatus 1 according to the present embodiment may further detect the degree of sympathy on the basis of the facial expression information of the user and the facial expression information of the partner. The detected degree of sympathy is stored in association with the captured image as additional information together with the tag of sympathy. Accordingly, the information processing apparatus 1 can "recommend a friend" to the user on the basis of the degree of sympathy. Specifically, the information processing apparatus 1 can recommend the user a partner who has a higher degree of sympathy as a "friend you might get along with".

Further, the information processing apparatus 1 may count the number of times the user feels sympathy, such as the number of times the user smiles with the partner, and may output the counted number to a health management application.

Further, the information processing apparatus 1 may create a map of sympathy in which the location where the user has felt sympathy with another person is shown on a map image, by using location information showing the place where the user has felt sympathy.

Furthermore, since the information processing apparatus 1 according to the present embodiment acquires facial expression information on the basis of the movement of the skin of the face, not on the basis of a voice such as a laughing voice or a crying voice, it is possible to determine whether or not the user and the partner feel sympathy even when it is difficult for the user and the partner to have conversations when watching a movie, for example.

Further, information processing apparatus 1 can generate an image by combining photographs or generating stamps, for example, on the basis of the added tag of sympathy. For example, as shown in FIG. 8, in a case in which the user and the partner wear the information processing apparatus 1'A and the information processing apparatus 1'B, respectively, the information processing apparatus 1'A photographs the user 20B as a subject and the information processing apparatus 1'B photographs the user 20A as a subject by using the agreement of the facial expression of the user and the facial expression of the partner as a trigger. Then, the information processing apparatus 1'A can combine a captured image obtained by the information processing apparatus 1'A with a captured image obtained by the information processing apparatus 1'B to generate one image including the facial expression of the user and the facial expression of the partner at the time when the user and the partner feel sympathy.

Further, the information processing apparatus 1 may generate a stamp showing facial expression information that has been added as a tag to the captured image that has been obtained by using sympathy as a trigger, and may generate the captured image. For example, in a case in which a tag of "smile" is added to the captured image, the information processing apparatus 1 generates an image obtained by superimposing an image showing "smile" on the captured image. The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1) An information processing apparatus including:
an information acquiring unit provided in the information processing apparatus to be worn on a head of a user, the information acquiring unit being configured to acquire facial expression information of the user; and
a control unit configured to perform certain control depending on whether or not the facial expression information of the user acquired by the information acquiring unit agrees with facial expression information of a partner.

(2) The information processing apparatus according to (1), wherein the control unit performs control in a manner that at least one of a captured image, sound data, place, and time is recorded when the facial expression information of the user agrees with the facial expression information of the partner.

(3) The information processing apparatus according to (2), further including:
an imaging unit configured to image a direction of a line of sight of the user when the information processing apparatus is worn on the head of the user,
wherein the control unit performs control in a manner that the imaging unit performs imaging when the facial expression information of the user agrees with the facial expression information of the partner.

(4) The information processing apparatus according to any one of (1) to (3),
wherein the control unit adds a tag of sympathy to the captured image when the facial expression information of the user agrees with the facial expression information of the partner, and then records the captured image.

(5) The information processing apparatus according to any one of (1) to (4),
wherein the information acquiring unit acquires the facial expression information of the user on the basis of data obtained by detection of movement of skin of a face of the user.

(6) The information processing apparatus according to (5), wherein the information acquiring unit acquires the facial expression information of the user on the basis of data obtained by detection of movement of skin of at least one of a cheek, a side portion of a corner of an eye, and a portion between eyebrows of the user.

(7) The information processing apparatus according to any one of (1) to (6), further including:
a receiving unit configured to receive the facial expression information of the partner from another information processing apparatus worn on a head of the partner.

(8) The information processing apparatus according to any one of (1) to (7), further including:
an imaging unit configured to image a direction of a line of sight of the user when the information processing apparatus is worn on the head of the user,
wherein the facial expression information of the partner is acquired on the basis of an image of a face of the partner, the image being captured by the imaging unit.

(9) The information processing apparatus according to any one of (1) to (8),
wherein the information processing apparatus is a glasses-type wearable device.

(10) A control method including:
acquiring, by an information acquiring unit provided in an information processing apparatus to be worn on a head of a user, facial expression information of the user; and
performing certain control depending on whether or not the acquired facial expression information of the user agrees with facial expression information of a partner.

(11) A program for causing a computer to function as:
an information acquiring unit provided in the information processing apparatus to be worn on a head of a user, the information acquiring unit being configured to acquire facial expression information of the user; and
a control unit configured to perform certain control depending on whether or not the facial expression information of the user acquired by the information acquiring unit agrees with facial expression information of a partner.

What is claimed is:

1. A first information processing apparatus, comprising:
a first camera configured to capture a first image, wherein the first camera has a first imaging direction, and wherein the first information processing apparatus is wearable on a first user's head;
a second camera configured to capture a second image, wherein the second camera has a second imaging direction opposite to the first imaging direction; and
at least one processor configured to:
acquire first facial expression information of a first user based on the captured first image;
acquire second facial expression information of a second user based on the captured second image; and
control the second camera to capture a third image, based on the acquired first facial expression information of the first user that is same as the acquired second facial expression information of the second user.

2. The first information processing apparatus according to claim 1, wherein the at least one processor is further configured to record at least one of the captured third image, sound data, place data, or time data based on the first facial expression information of the first user that is same as the second facial expression information of the second user.

3. The first information processing apparatus according to claim 2,
wherein the second camera is further configured to capture the third a image in a direction of a first user's line of sight in a case where the first information processing apparatus that is worn on the first user's head,
wherein the at least one processor is further configured to control the second camera to capture the third image in the direction of the first user's line of sight, based on the first facial expression information of the first user that is same as the second facial expression information of the second user.

4. The first information processing apparatus according to claim 1, wherein the at least one processor is further configured to:
add a tag to the captured third image based on the first facial expression information of the first user that is same as the second facial expression information of the second user, wherein the tag indicates that the third image is captured based on a determined facial expression as a trigger; and
control a memory to record the captured third image.

5. The first information processing apparatus according to claim 1, further comprising at least one sensor configured to:
detect a movement of skin of a first user's face; and
acquire the first facial expression information of the first user based on the detected.

6. The first information processing apparatus according to claim 5, wherein the skin of the first user's face comprises the skin of at least one of a first user's cheek, a side portion of a corner of a first user's eye, or a portion between first user's eyebrows.

7. The first information processing apparatus according to claim 1, further comprising a receiving unit configured to receive the second facial expression information of the second user from a second information processing apparatus, wherein the second information processing apparatus is wearable on a second user's head.

8. The first information processing apparatus according to claim 1, wherein the second camera is configured to capture the second image of a second user's face.

9. The first information processing apparatus according to claim 1, wherein the first information processing apparatus is a glasses-type wearable device.

10. A control method, comprising:
in an information processing apparatus that is wearable on a first user's head:
capturing, by a first camera of the information processing apparatus, a first image, wherein the first camera has a first imaging direction;
capturing, by a second camera of the information processing apparatus, a second image,
wherein the second camera has a second imaging direction opposite to the first imaging direction;
acquiring, by a processor of the information processing apparatus, first facial expression information of a first user based on the captured first image;
acquiring, by the processor of the information processing apparatus, second facial expression information of a second user based on the captured second image; and
controlling, by the processor of the information processing apparatus, the second camera to capture a third image, based on the acquired first facial expression information of the first user that is same as the acquired second facial expression information of the second user.

11. A non-transitory computer-readable medium having stored thereon computer-executable instructions which, when executed by a processor of an information processing apparatus, cause the processor to execute operations, the operations comprising:
controlling a first camera of the information processing apparatus to capture a first image, wherein the first camera has a first imaging direction, and wherein the information processing apparatus is wearable on a first user's head;
controlling a second camera of the information processing apparatus to capture a second image, wherein the second camera has a second imaging direction opposite to the first imaging direction;
acquiring first facial expression information of a first user based on the captured first image;
acquiring second facial expression information of a second user based on the captured second image; and
controlling the second camera to capture a third image, based on the acquired first facial expression information of the first user that is same as the acquired second facial expression information of the second user.

12. The first information processing apparatus according to claim 1, wherein the at least one processor is further configured to control a shutter operation of the second camera based on the first facial expression information of the first user that is same as the second facial expression information of the second user.

13. The first information processing apparatus according to claim 1, wherein the first facial expression information corresponds to a first user's smile, and wherein the second facial expression information corresponds to a second user's smile.

14. The first information processing apparatus according to claim 1, wherein the first facial expression information corresponds to a first expression of sympathy by the first user, and wherein the second facial expression information corresponds to a second expression of sympathy by the second user.

* * * * *